Patented June 18, 1940

2,205,111

UNITED STATES PATENT OFFICE 2,205,111

ENTERIC COATING

Ernest H. Volwiler, Highland Park, and Marjorie B. Moore, Waukegan, Ill., assignors to Abbott Laboratories, North Chicago, Ill., a corporation of Illinois No Drawing. Application August 28, 1936, Serial No. 98,339. Renewed November 20, 1939

9 Claims. (Cl. 167—82)

This invention relates to coatings for oral medicaments such, for example, as pills, capsules, tablets and the like, and particularly to an enteric coating whereby therapeutically active substances may be administered in pill, capsule or tablet form and conveyed unchanged to the intestinal tract before the coating is dissolved or disintegrated and the medicament released.

Various substances have heretofore been proposed for enteric coatings in an attempt to prevent disintegration in the stomach and release of the enclosed medicament solely in the intestinal tract. Thus, for example, keratin, gelatin alone but preferably hardened with formaldehyde, tolu, cellulose esters or ethers, fats or fatty acids containing a disintegrating solid such as magnesium oxide, and shellac, have been proposed.

In spite of the numerous proposals in this field, none of the compositions have proved wholly satisfactory in view of the rigid requirements for a high degree of stability under acid conditions in the stomach together with rapid decomposition in the intestines as well as the necessary absence of undesirable physiological effect from the coating itself. Sollmann in "A Manual of Pharmacology", p. 38, third edition, mentions that keratin, Salol, stearic acid, or formaldehyde-hardened gelatin are "supposed" to afford protection against gastric juices but "unfortunately they fail to accomplish the purpose for soluble drugs diffused through them rapidly". The presence of enzymes as well as peristaltic movement impose factors which make it impossible to predict with any accuracy new compositions for trial merely on the basis of chemical constitution. Attempts have been made to select new coatings on the assumption that gastric juices are acid whereas intestinal juices are alkaline, but recent investigations have shown that often the small intestine is slightly acid in reaction. J. Am. Pharm. Asso. 24, page 573 (1935). Moreover, many of the coatings proposed in the past were crystalline, brittle and easily friable and thus unsuitable because of "chipping" of a portion of the coat allowing access of the stomach juices to the unprotected portion of the medicament. Other coatings which did not flow well tended to trap air bubbles and thus give "pin-holes" in the coat. Some other prior coatings while resistant to the gastric juices and enzymes in the stomach were also resistant to the intestinal fluids, thus permitting the passage of the coated medicament clear through the body without the release of the medicament.

This invention has as an object the preparation of coated enteric pills, capsules, tablets and the like. A further object is the provision of a coating for pills, etc. which coating will permit the passage of a medicament through the digestive tract to the intestinal tract, there to release the medicament to accomplish its therapeutic purpose. It is another object of the invention to provide a coating of this character which may be applied to medicaments and administered in such quantities as may be desired without any dangerous physiological effect and without any likelihood of undesirable pathological reactions from the coating itself. It is another object of the invention to provide a coating of this class which will protect the material coated from the acids and juices in the stomach and yet at the same time be of such a nature that they will be dissolved in the intestinal tract for releasing the medicine. It is also another object of the invention to provide an enteric coating which will not chip off and which will be free from pin-holes. Other objects will appear hereinafter.

These objects are accomplished by the following invention wherein a pill is coated with a polyhydric alcohol-polycarboxylic acid condensation product modified by a waxy esterification component, e. g., a high molecular weight alcohol or fatty acid.

We have found that a class of synthetic resins known as polyhydric alcohol-polycarboxylic acid resins are highly satisfactory and represent an important advance over known enteric coatings. These resins are formed by esterifying a polyhydric alcohol with a polycarboxylic acid. Particularly suitable for enteric coatings are those resins in which a portion of the polycarboxylic acid has been replaced by a monocarboxylic acid and especially a higher fatty acid or a portion of the polyhydric alcohol has been replaced by a high molecular weight alcohol. The incorporation of the higher fatty acid or high molecular weight alcohol imparts better organic solubility and at the same time improves the water- and acid-resistance of the resin. It is also preferred to carry the esterification short of completion in order to obtain a resin with residual acidity.

Having thus outlined the principles and objects of the invention, the following exemplifications thereof are added in illustration and not in limitation.

*Example I*

Stearic acid (17.57 parts), phthalic anhydride (53.65 parts) and glycerol (28.78 parts) were fused together in an aluminum vessel and stirred by means of a current of carbon dioxide at 200° C. until titration of the sample showed that the acid number had decreased to about 45. This required about three hours. (Resins with an acid value up to 65 have been found satisfactory but a lower value is preferred.) The product was a waxy resin soluble in ketones, esters, halogenated hydrocarbons and aromatic hydrocarbons.

*Example II*

Stearic acid (53.38 parts), phthalic anhydride (27.16 parts), and glycerol (19.46 parts) were heated and stirred with a slow stream of carbon dioxide at 225° C. for approximately five hours after which the acid number had decreased to about 5. This product was also a waxy resin soluble in hydrocarbon solvents as well as certain oxygenated solvents such as acetone.

*Example III*

In place of the ingredients mentioned in Example II, there were used 30 parts of stearic acid, 27.5 parts of phthalic anhydride, 25 parts of rosin and 17.5 parts of glycerol. This resin had an acid number of 8.2 and was prepared in a manner analogous to that described in Examples I and II.

In the above examples, resin formation was effected through the esterification of phthalic anhydride with glycerol, which in view of the nature of these reacting constituents resulted in a condensation product of high molecular weight. If phthalic anhydride and glycerol alone are reacted together in stoichiometrical proportions, the product rapidly attains such exceedingly high molecular weight as to become insoluble in common organic solvents. It is therefore necessary to control this reaction very carefully in order to obtain the optimum of technically useful products.

In the preferred embodiment of the present invention, a portion of the phthalic anhydride is replaced by an equivalent quantity of stearic acid. The stearic acid combines with a portion of the glycerol hydroxyl groups and the remaining hydroxyl groups of glycerol are esterified with phthalic anhydride to form the polyester. It is evident, therefore, that the stearic acid is chemically combined in the finished resins. The resulting products share the properties of waxes on the one hand and condensates on the other. When the resin is modified by a high molecular weight alcohol the hydroxyl groups thereof react with the phthalic anhydride resulting in a true chemical combination.

These resins may be coated on pills by using any of the known procedures, for example, by dissolving the resin in a suitable volatile solvent, and tumbling pills in the solution. The pills are separated from the excess solution and dried. The pills may also be coated by spraying or by the regular pan coating method.

The following solvents are few of those found suitable for dissolving the modified polyhydroxypolycarboxylic acid resins: acetone, methyl ethyl and methyl propyl ketones, ethyl acetate, ethylene chloride, trichlorethylene, and tetrahydronaphthalene. Of the above solvents, the ketones and particularly methyl propyl ketone are preferred because of their high solvent power and suitable vapor pressure which permits easy removal by evaporation. A 30 to 50 percent solution is ordinarily employed.

In coating tablets or capsules, it is desirable that any sharp edges be removed in order to obtain an enteric coating of uniform thickness and free from pin-holes. For this purpose it is preferred to make a preliminary coating such as a sugar coating of such tablets or capsules, continuing to build up the inner coating in the usual manner until a smooth rounded outline is obtained. The outer enteric coating is then applied, such, for example, as by the pan-coating method. When the solution of resin is quite viscous the tablets have a tendency to clump together after its addition. In order to separate them a lubricating agent is generally added until the clumps are broken up. Talc has been found not to interfere with the acid-resistance of the coating, and it is preferred because of this property and its lack of toxicity, but the use of other lubricating agents will occur to those versed in the art.

The number of coats of resin to be used will depend upon the thickness of each coat and the degree of resistance required. For some tablets containing a potent medicament that would be nauseating to the patient, it is most important that no tablet disintegrate in the stomach, with absorption in the small intestine being a secondary factor; for others the reverse is true. In most cases, however, it is desirable that absorption take place in the small intestine. Heavy coats mean greater certainty that no tablet will disintegrate in the stomach, but in patients whose intestines do not possess the normal alkaline reaction, disintegration may be retarded until the tablet reaches the large intestine.

This invention embraces polyhydric alcohol-polycarboxylic acid resins generally with preference to the modifications in which a portion of the polycarboxylic acid is replaced by a higher fatty acid. In the glycerol phthalate type of resin, stearic acid is preferably incorporated to the extent of approximately 20 percent of the total reacting ingredients. In place of phthalic anhydride used in the examples, polycarboxylic acid in general including adipic acid, succinic acid, malic acid, tartaric acid or citric acid may be used. In place of the glycerol polyhydric alcohols in general including ethylene glycol or hexamethylene glycol, pentaerythritol or sorbitol may be used. In place of stearic acid or rosin, palmitic acid, lauric acid, or drying oil acids such as linseed oil acids or China-wood oil acids may be used. In general, the most satisfactory resins are obtained from the use of higher fatty acids which are waxy in nature and these are of general application. Alternatively, the waxy character may be imparted to these resins by replacing a portion of the glycerol with high molecular weight monohydric and/or polyhydric alcohols, e. g., octadecyl alcohol, cetyl alcohol, hydrogenated castor oil, octadecanediol, or batyl alcohol.

The chief advantage of these enteric coatings lies in their high degree of stability towards gastric juices and high susceptibility to intestinal disintegration. The unsatisfactory character of previous enteric coatings has been shown by Bukey, Jour. Am. Pharm. Assoc. 24, p. 567 (1935). By using capsules and tablets containing barium sulfate, it is possible to follow disintegration through the use of X-rays. The efficiency of the coating is determined by the percentage of the total number of pills which disintegrate in the intestines. Of various commercial coatings tested, shellac had no value since disintegration invariably occurred in the stomach. On tablets, a salol-resin mixture was 63.00% efficient; a Salol-shellac coating was 66.66% efficient; and one out of two keratin coatings showed 80.95% efficiency, the other being of no value because of total disintegration in the stomach. The results on keratin illustrate the mechanical difficulty of obtaining a satisfactory coating with this material.

Under the same conditions, the preferred coatings of the present invention have shown efficiencies considerably in excess of known coatings. In contrast to salol (phenyl salicylate) and stearic acid which are crystalline, the present coating compositions are resinous and are therefore of great advantage in giving continuous impervious films which prevent diffusion of the medicine. Furthermore, the resins containing stearic acid form non-tacky coatings of good appearance. They are non-toxic and non-irritating. They are also non-crystalline and have no tendency to crack or chip.

Any type of pills intended for disintegration in the intestines where premature disintegration in the stomach would cause undesirable effects such as nausea or reduction in efficiency of the medicinal may be coated by the resins of the present invention. Specifically, they may be used on pills containing salts of mercury, gold or iron, arsenic compounds, creosote, salicylic acid, tannin, alum, pancreatin, trypsin, bile salts, iron sulphide, methylene blue, acriflavine, etc. They may also be used for coating pills containing anthelminthics. Finally, these products may be used on capsules and tablets as well as pills.

The above description and examples are intended to be illustrative only. Any modification of or variation therefrom which conforms to the spirit of the invention is intended to be included within the scope of the claims.

We claim:

1. An enteric coating for oral medicaments such as pills, capsules, tablets and the like, comprising about twenty percent stearic acid modified phthalic glyceride condensation product.

2. An enteric coating for pills and tablets comprising a stearic acid modified phthalic glyceride condensation product.

3. An enteric coating for pills and tablets comprising a phthalic glyceride resin modified by a higher fatty acid of waxy nature.

4. An enteric coating for pills and tablets comprising a twenty percent stearic acid modified polyhydric alcohol-polycarboxylic acid condensation product.

5. An enteric coating for pills and tablets comprising a stearic acid modified polyhydric alcohol-polycarboxylic acid condensation product.

6. An enteric coating for pills and tablets comprising a polyhydric alcohol-polycarboxylic acid resin modified by a higher fatty acid of waxy nature.

7. An enteric coating for oral medicaments such as pills and tablets, comprising a polyhydric alcohol-polycarboxylic acid resin modified with a waxy high molecular weight esterification component of the class consisting of high molecular weight alcohols and high molecular weight fatty acids.

8. An oral medicament having a smooth preliminary sugar coating, said preliminary coating having an outer enteric coating consisting of a higher fatty acid modified polyhydric alcohol-polycarboxylic acid resin.

9. A pill, capsule, tablet or the like having a smooth preliminary sugar inner coating and an outer enteric coating consisting of a stearic acid-phthalic anhydride-glycerol condensation product.

ERNEST H. VOLWILER.
MARJORIE B. MOORE.